United States Patent
Tan et al.

[11] Patent Number: 6,029,893
[45] Date of Patent: Feb. 29, 2000

[54] OPTICAL SCANNER HAVING A REFLECTED LIGHT COLLECTOR INCLUDING HOLOGRAPHIC OPTICAL ELEMENTS

[75] Inventors: Chinh Tan, Bohemia; Yajun Li, Oakdale; Miklos Stern, Flushing, all of N.Y.

[73] Assignee: Symbol Technologies, Inc., Holtsville, N.Y.

[21] Appl. No.: 08/876,681

[22] Filed: Jun. 17, 1997

Related U.S. Application Data

[63] Continuation of application No. 08/447,089, May 22, 1995, abandoned.

[51] Int. Cl.⁷ .................................................. G06K 7/10
[52] U.S. Cl. .............................. 235/462.34; 235/462.33; 235/462.45
[58] Field of Search .................................. 235/462, 472, 235/467, 457, 462.34, 462.35, 462.33, 462.45; 359/212, 205, 206, 207, 208, 362, 365, 366, 363, 364

[56] References Cited

U.S. PATENT DOCUMENTS

| | | | |
|---|---|---|---|
| 3,051,051 | 8/1962 | Jeffree | 88/57 |
| 3,396,344 | 8/1968 | Broom | 331/94.5 |
| 3,780,270 | 12/1973 | Faulkner et al. | 235/61.11 E |
| 3,790,756 | 2/1974 | Graves et al. | 235/61.11 |
| 3,871,748 | 3/1975 | Day | 350/181 |
| 4,199,816 | 4/1980 | Humphrey | 364/571 |
| 4,360,798 | 11/1982 | Swartz et al. | 340/146.3 |
| 4,369,361 | 1/1983 | Swartz et al. | 235/470 |
| 4,500,776 | 2/1985 | Laser | 235/162 |
| 4,508,686 | 4/1985 | Shaber et al. | 422/55 |
| 4,538,895 | 9/1985 | Higgins et al. | 355/3 R |
| 4,555,164 | 11/1985 | Feinbloom | 350/420 |

(List continued on next page.)

FOREIGN PATENT DOCUMENTS

| | | |
|---|---|---|
| 0 249 713 | 12/1987 | European Pat. Off. . |
| 0 385 478 | 5/1990 | European Pat. Off. . |
| 0 492 065 | 7/1992 | European Pat. Off. . |
| 0 589 361 | 3/1994 | European Pat. Off. . |
| 3602008 | 7/1987 | Germany . |
| 55-88172 | 7/1980 | Japan . |
| 0195639 | 10/1985 | Japan . |
| 61-120283 | 6/1986 | Japan . |
| 0093871 | 4/1989 | Japan . |
| 3-127191 | 5/1991 | Japan . |
| 0198175 | 8/1991 | Japan . |
| 6-150039 | 5/1994 | Japan . |
| WO 93/18478 | 9/1993 | WIPO . |
| WO 94/01835 | 1/1994 | WIPO . |

OTHER PUBLICATIONS

"Quick Check 500" Brochure, Photographic Sciences, 2 pages, 1989.

Barkan, Automatic I.D. News, "Author Verifies the Key to Bar Codying Success", (Nov. 1988).

Grabowski, et al., "Code Reading Mechanical Scanning Gun", IBM Technical Disclosure Bulletin, vol. 5, No. 5 Oct. 1962.

Yamazaki et al., "New Holographic Technology for a Compact POS Scanner," Applied Optics, vol. 29, No. 11 (Apr. 1990).

*Primary Examiner*—Karl D. Frech
*Attorney, Agent, or Firm*—Fish & Richardson P.C.

[57] ABSTRACT

An optical scanner such as a bar code scanner has a window comprising a holographic optical element through which both the outgoing scanning beam and the returned reflective light passes. The frequency distribution of the element may be chosen to achieve certain desirable characteristics, for example the removal of the dead zone immediately in front of the scanner and control of the beam profile and field of view. The element may be divided up into several separate zones or regions one of which is adapted to control the outgoing beam and the other of which is adapted to receive the incoming reflected light and to focus it onto a photodetector.

20 Claims, 8 Drawing Sheets

U.S. PATENT DOCUMENTS

| | | | |
|---|---|---|---|
| 4,560,862 | 12/1985 | Eastman et al. | 235/467 |
| 4,570,057 | 2/1986 | Chadima, Jr., et al. | 235/472 |
| 4,606,660 | 8/1986 | Bradshaw et al. | 400/62 |
| 4,641,018 | 2/1987 | Mazumder et al. | 235/462 |
| 4,652,750 | 3/1987 | Eastman et al. | 250/239 |
| 4,705,939 | 11/1987 | Ulinski, Sr. | 235/466 |
| 4,721,860 | 1/1988 | Troendle | 250/568 |
| 4,748,316 | 5/1988 | Dickson | 235/454 |
| 4,777,357 | 10/1988 | Harada et al. | 235/463 |
| 4,795,281 | 1/1989 | Ulinksi, Sr., et al. | 400/74 |
| 4,820,911 | 4/1989 | Arackellian et al. | 235/467 |
| 4,822,986 | 4/1989 | Guthmueller et al. | 235/462 |
| 4,825,048 | 4/1989 | Poland | 235/472 |
| 4,826,269 | 5/1989 | Streifer et al. | 350/3.72 |
| 4,841,129 | 6/1989 | Tawara et al. | 235/462.39 |
| 4,860,226 | 8/1989 | Martin et al. | 364/552 |
| 4,894,790 | 1/1990 | Yotsuya et al. | 364/552 |
| 4,896,026 | 1/1990 | Krichever et al. | 235/472 |
| 4,916,298 | 4/1990 | Raphael | 235/463 |
| 4,933,538 | 6/1990 | Heiman et al. | 235/462 |
| 4,980,544 | 10/1990 | Winter | 235/436 |
| 4,992,649 | 2/1991 | Mampe et al. | 235/462 |
| 5,013,895 | 5/1991 | Iggulden et al. | 235/110 |
| 5,015,831 | 5/1991 | Eastman | 235/462 |
| 5,034,904 | 7/1991 | Moy | 364/571.04 |
| 5,047,617 | 9/1991 | Shepard et al. | 235/467 |
| 5,064,258 | 11/1991 | Inokuchi et al. | 350/3.71 |
| 5,067,093 | 11/1991 | Przybylowicz et al. | 364/498 |
| 5,073,954 | 12/1991 | Van Tyne et al. | 382/18 |
| 5,081,639 | 1/1992 | Synder et al. | 372/101 |
| 5,115,334 | 5/1992 | Tomita | 359/216 |
| 5,170,277 | 12/1992 | Bard et al. | 359/210 |
| 5,194,720 | 3/1993 | Reinnagel et al. | 235/437 |
| 5,200,597 | 4/1993 | Eastman et al. | 235/455 |
| 5,210,398 | 5/1993 | Metlitsky | 235/462 |
| 5,218,190 | 6/1993 | Hardesty et al. | 235/462 |
| 5,229,591 | 7/1991 | Heiman et al. | 235/472 |
| 5,233,170 | 8/1993 | Metlitsky | 235/462 |
| 5,235,167 | 8/1993 | Dvorkis et al. | 235/462 |
| 5,250,791 | 10/1993 | Heiman et al. | 235/472 |
| 5,254,844 | 10/1993 | Krichever | 235/462 |
| 5,280,161 | 1/1994 | Niwa | 235/462 |
| 5,291,319 | 3/1994 | Harris | 359/18 |
| 5,304,788 | 4/1994 | Metlitsky | 235/467 |
| 5,327,451 | 7/1994 | Walker et al. | 372/98 |
| 5,332,892 | 7/1994 | Li et al. | 235/462 |
| 5,420,411 | 5/1995 | Salatto, Jr. et al. | 235/462.22 |
| 5,438,187 | 8/1995 | Reddersen | 235/462 |
| 5,440,111 | 8/1995 | Eastman et al. | 235/462.36 |
| 5,576,529 | 11/1996 | Koenck et al. | 235/472 |
| 5,591,954 | 1/1997 | Spencer | 235/462.4 |
| 5,640,001 | 6/1997 | Danielson et al. | 235/472 |
| 5,671,084 | 9/1997 | Kurtz | 359/362 |
| 5,693,930 | 12/1997 | Katoh et al. | 235/467 |
| 5,742,038 | 4/1998 | Dvorkis et al. | 235/462.38 |
| 5,859,417 | 1/1999 | Dvorkis et al. | 235/467- |

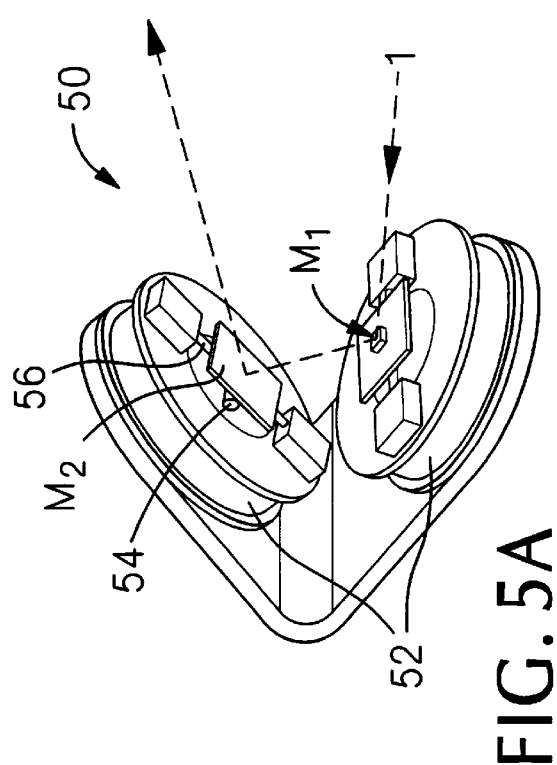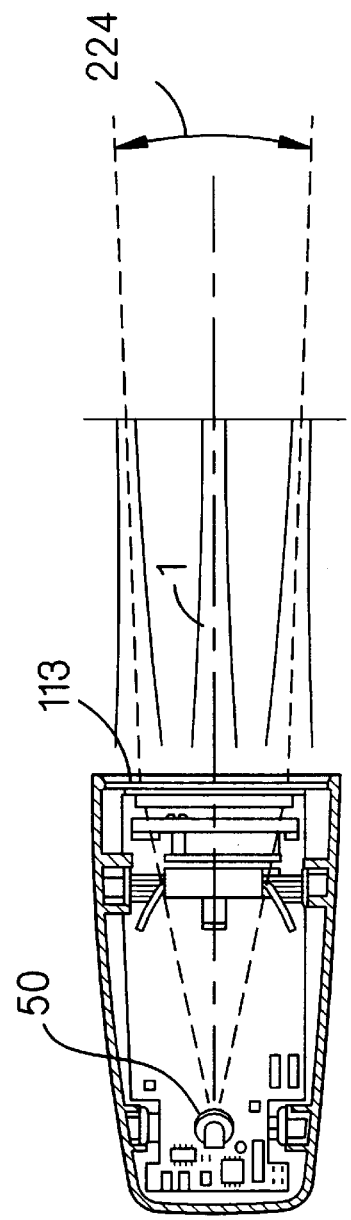

OPTICAL SCANNER HAVING A REFLECTED LIGHT COLLECTOR INCLUDING HOLOGRAPHIC OPTICAL ELEMENTS

This is a continuation of application Ser. No. 08/447,089, filed May 22, 1995, now abandoned.

BACKGROUND OF THE INVENTION

The invention relates generally to optical scanners, and in particular to the light collection optics thereof.

It is a common concern of designers of optical scanners, particularly although not only designers of portable bar code scanners, to ensure that neither the scanner size nor its weight becomes too large. The size constraints have meant that portable laser bar code scanners normally use non retro-reflective scanning techniques, thereby eliminating the need to use large scanning mirrors. However, the field of view of a non-retro-reflective scanner is large and fixed, resulting in a relatively high level of background noise and noise from laser speckle, thereby causing scanner performance to suffer. Additionally, small scanning mirrors may be used only in certain applications such as hand-held omnidirectional scanners, integrated scanners, or scanners in which the scanning element is mounted to a single chip. In other applications, it may be technically preferable to use much larger mirrors but small photodetectors.

There is a need to make retro-reflective scanning technology more widely available, particularly for portable laser bar code scanners, thereby obviating at least some of the difficulties which are associated with non-retro-reflective scanners.

One approach for dealing with this problem is disclosed in U.S. Pat. No. 5,332,892, commonly assigned with the present application. This discloses a system in which non-conventional optics and sensing elements are used to expand the scanner working range, beam scan angle, and also to improve bar code symbol readability over a broad range of bar code densities.

Yamazaki et al., "New holographic technology for a compact POS scanner," Applied Optics, Vol. 29, No. 11 (Apr. 10, 1990) discloses a laser scanner in which the window of the scanner is replaced by a holographic plate, which is said to reduce the size of the system and thereby provide a more compact point-of-sale scanner to make the cashier's task easier.

It has also been known for a number of years to make use of a holographic disk as the scan element of a bar code scanner.

SUMMARY OF THE INVENTION

It is an object of the present invention at least to alleviate some of the problems of the prior art.

It is a further object to produce a convenient and inexpensive scanner of small size and of relatively low parts count.

It is a further object of the present invention to increase the applications in which retro-reflective scanning techniques may be used.

It is a further object to provide a scanner in which the cross-section of the focused laser spot may easily be controlled during manufacture.

It is a further object to provide a scanner with a reduced dead decode zone in front of the scan window of the scanner.

It is a further object to provide a scanner with extended working range and/or high resolution in decoding high density bar code symbols.

It is a further object of the present invention to provide an improved system for collecting light returned from a target symbol, thereby reducing the size and weight of a retro-reflective scanning/collector mirror.

In general, the invention features using a light source to produce a light beam to scan across a target; shaping and directing the light beam with one or more beam-generation optical elements; collecting and shaping light reflected from the target with one or more collector optical elements; using a photosensor to detect at least a portion of the light collected by the collector elements, and to generate an electrical signal indicative of the intensity of the light collected, wherein at least one of the collector optical elements comprises an optical diffuser configured to shape the light collected. Preferably, at least one of the beam-generation optical elements comprises an optical diffuser configured to perform at least a portion of the step of shaping and directing the light beam.

In a second aspect, the invention features using a light source to produce a light beam to scan across a target; shaping and directing the light beam with one or more beam-generation optical elements; collecting and shaping light reflected from the target with one or more collector optical elements; using a photosensor to detect at least a portion of the light collected by the collector elements, and to generate an electrical signal indicative of the intensity of the light collected, wherein at least one of the beam-generation optical elements comprises an optical diffuser comprising a plurality of sections, each section configured to shape the light beam differently from another section. Preferably, at least one of the collector optical elements comprises an optical diffuser configured to shape the light collected.

Optical diffuser is used herein to refer to a light shaping diffuser (LSD) comprising a holographic element that accepts incoming light, and homogenizes and redistributes it over a predetermined angular spread. The holographic element may include all types of holographic optics technologies, including binary optics, holographic optics, and diffractive optics, and including transmissive as well as reflective elements, thereby achieving retro-reflecting scanning (where desired) while minimizing scanner size and potentially reducing the number of parts.

Preferably, the optical diffuser comprises a light-transmissive plate (e.g., a window in the scanner housing) through which the reflected light passes on its way back to the photodetector.

The optical diffuser (e.g., the holographic window) preferably comprises a first section having first optical properties and a second section having second optical properties. The light beam may be scanned across the window so that on its outgoing path it passes only through the first section of the window. This section is configured to focus and otherwise adjust the outgoing light beam according to the particular application required. The optical element (or at least that portion of it through which the outgoing light passes) may, for example, change the cross-section of the focused laser spot in order to read badly printed dot-matrix or postage symbols. The optical properties may also control the scan angle and remove the dead zone immediately in front of the scanner housing. Furthermore, it may flatten the curvature of the field.

A second section of the optical diffuser may be configured to receive the reflected light and to focus it on a photodetector. Since the overall collection efficiency of the scanner may be defined by the LSD, the size and weight of the scanner may be reduced, allowing only a very small retro-reflective mirror to be used. Where the scanner is of the non-retro-reflective type, the presence of the optical diffuser allows a simplification of the collection optics.

The optical diffuser is generally a thin planar member, reducing the overall size and complexity of the optics. With the invention, the laser focusing lens, collection mirror, and exit window of a conventional retro-reflective scanner can be collapsed into a single exit window with multiple holographic optical elements or diffractive optical elements.

Since a holographic optical element disperses white light, the scanner window appears colorful, a feature that may be attractive to potential users of wearable scanners.

The invention in its broadest aspects is applicable to all types of optical scanners, whether fixed or portable. A typical application is a laser bar code scanner, but in its broadest aspects, the invention is not so restricted and is applicable to optical scanners of all types for reading all types of indicia.

Other features of the invention will be apparent from the following description of preferred embodiments and from the claims.

BRIEF DESCRIPTION OF THE DRAWINGS

The invention may be practiced in a number of ways and several specific embodiments will now be described, by way of example, with reference to the accompanying drawings.

FIGS. 5A and 5B show how a suitable holographic scan window can be used to reduce the scan angle and flatten the scan field.

DESCRIPTION OF THE PREFERRED EMBODIMENTS

Figures 1A, 1B:
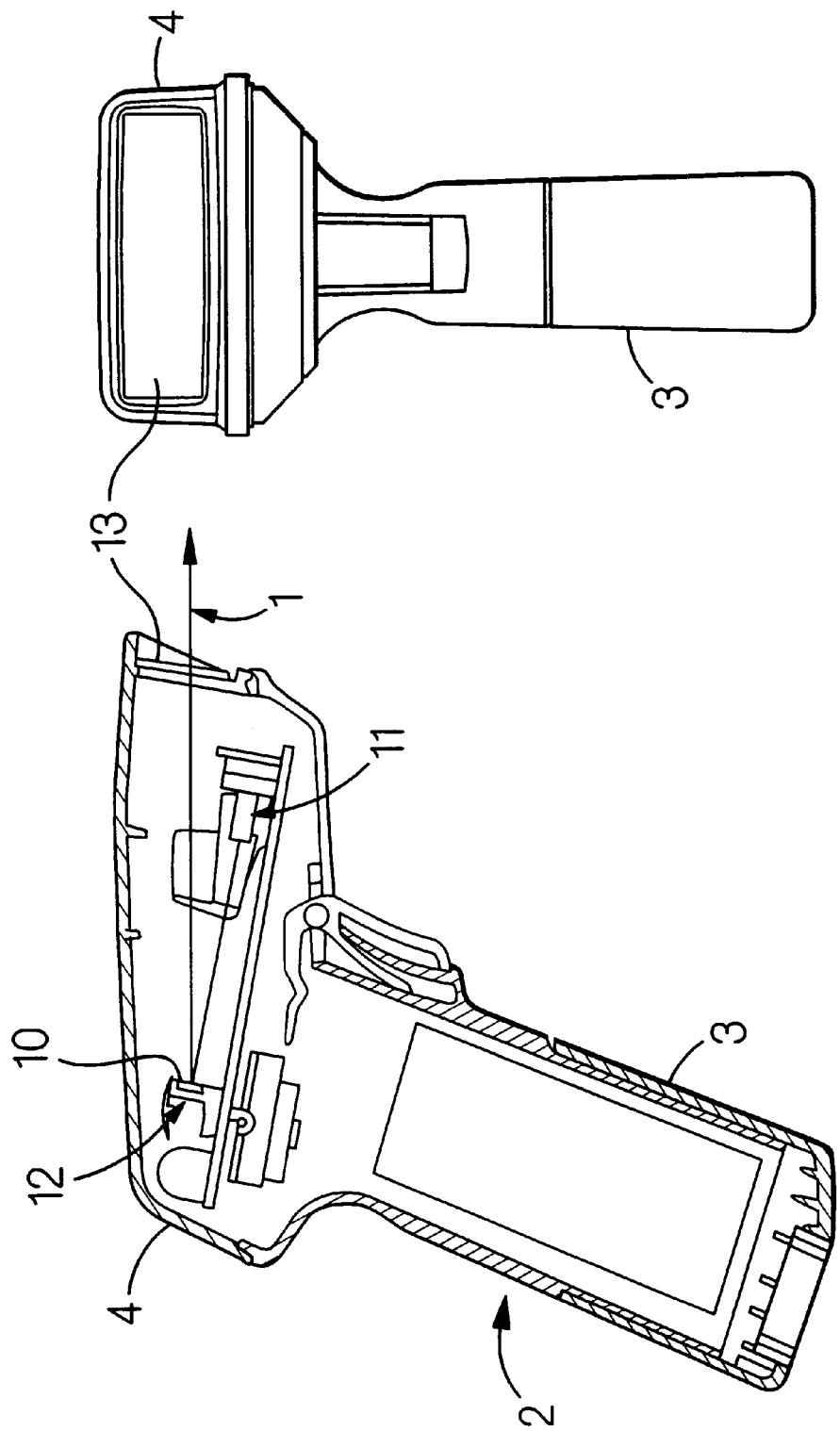
FIGS. 1A and 1B show respectively a section and a front view of a conventional hand-held retro-reflective bar code scanner.

FIGS. 1A and 1B show, respectively, sectional and front views of a conventional laser based hand-held bar code scanner. The scanner has a housing 2 comprising a manually graspable handle portion 3 and an enlarged head portion 4. Within the head portion 4 is a laser and focusing module 11 and a scanning element 12 incorporating a scan mirror 10. Light from the laser is directed onto the scanning mirror 10 from whence it is reflected in a scanning laser beam 1 out of the scanner housing via a window 13.

Figure 2C:
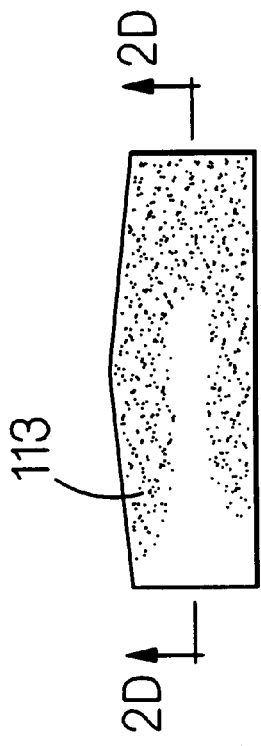
FIGS. 2C and 2D show a holographic scan window which may be used in a scanner embodying the present invention.
Figure 2D:
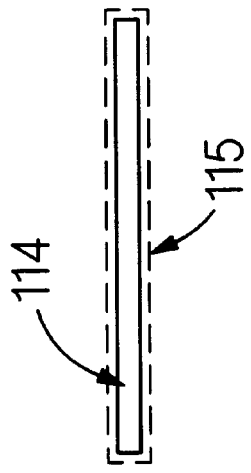
Figure 2A:
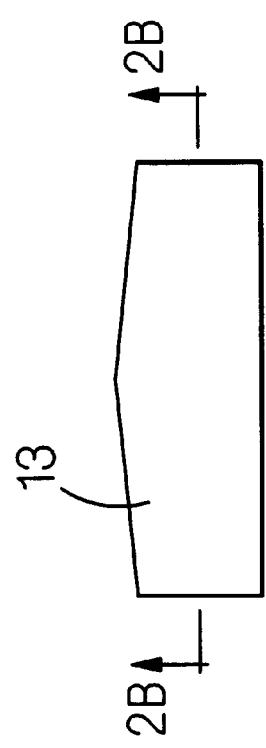
FIGS. 2A and 2B show a traditional scan window, of the type used in the scanner of FIGS. 1A and 1B.
Figure 2B:
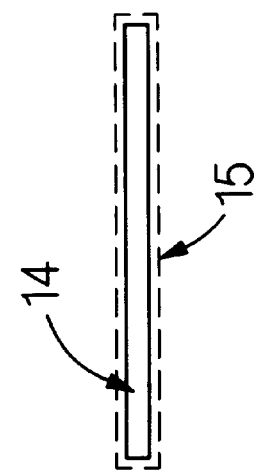

The scan window 13 is shown in more detail in FIGS. 2A and 2B. FIG. 2B represents the window as seen from the front, and FIG. 2A represents the window as seen in a section taken along 2B—2B in FIG. 2A. The window typically comprises a flat glass or plastics material plate 14, both sides of which are coated with either an anti-reflective coating 15 and/or a scratch-resistant coating.

FIGS. 2C and 2D show a holographic scan window 113 which may be used in the scanner of FIG. 1 in replacement for the conventional window 13. The holographic window comprises a holographic plate 114 having coated surfaces 115, similar to the coated surfaces 15 of the plate 13.

Figure 3A:
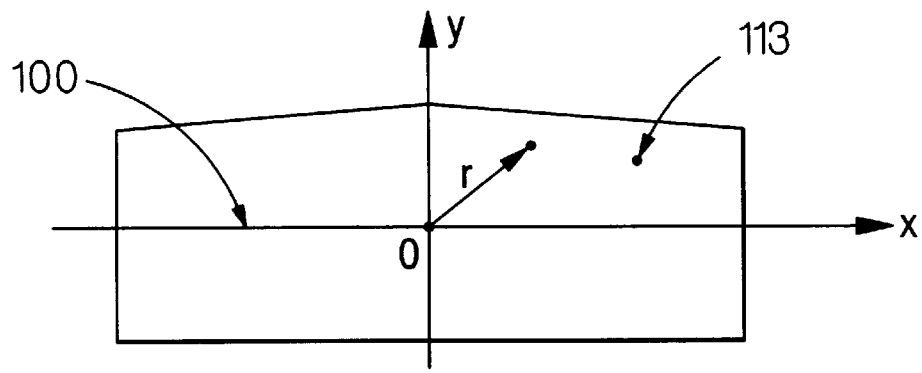
FIGS. 3A, 3B, and 3C show alternative embodiments of a holographic scan window.
Figure 3B:
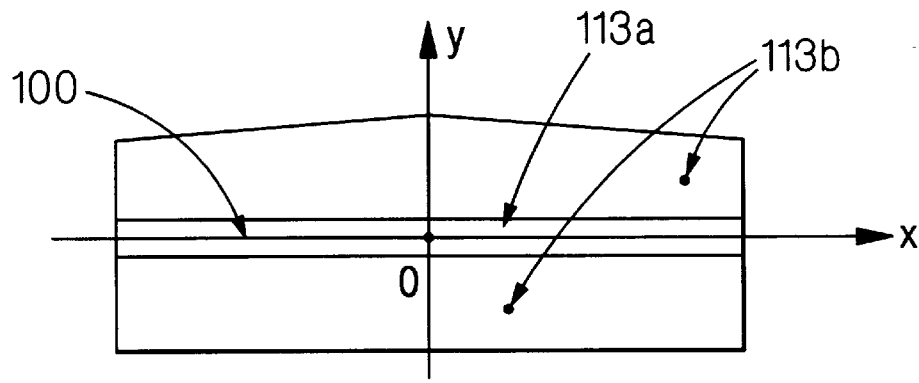
Figure 3C:
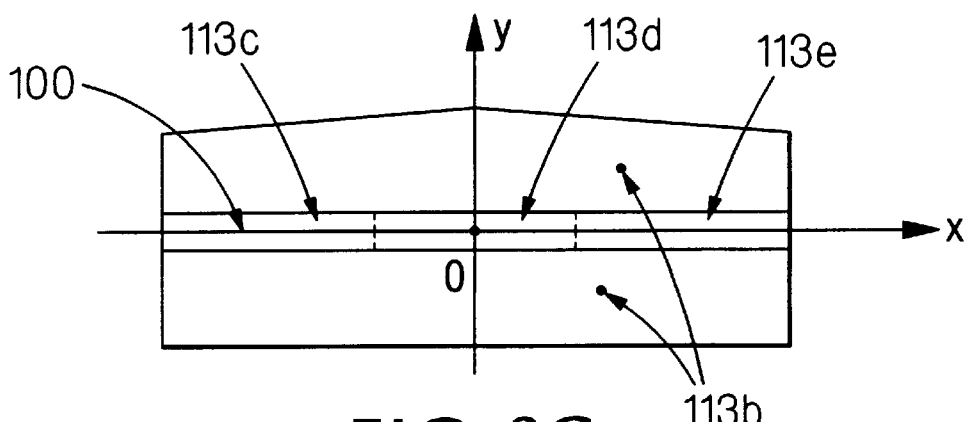

The plate 113, illustrated generally in FIG. 2C, may take one of three separate forms, illustrated in more detail in FIGS. 3A to 3C. Each of these will now be described in turn. In each case, the path of the outgoing scanning laser beam across the plate is shown by the line 100.

In the embodiment of FIG. 3A the holographic scan window has a unified spatial frequency distribution, which may preferably be given by the following equation:

$$v(r) = \frac{1}{\lambda}\sin\left(\tan^{-1}\frac{r}{f}\right) \qquad (1)$$

Where v represents the spatial frequency distribution over the window, λ the wavelength of the recording wave, f the focal length of the hologram, and r the distance from the origin O as illustrated in FIG. 3A.

It is known that in wave front reconstruction a series of diffraction images is generated. In order to make these images separable, an oblique reference wave is desirable during recording of the hologram. This oblique reference wave leads to the following alternative spatial frequency distribution over the scan window:

$$v(r) = \frac{1}{\lambda}\left[\sin\left(\tan^{-1}\frac{r}{f}\right) - \sin\theta\right] \qquad (2)$$

Where θ is the oblique angle of the reference wave.

One of ordinary skill will readily appreciate that a holographic scan window as described above may be made by a two-step process. The first step comprises preparing a stamping master that can be made either by optical interference of two laser beams, by a computer generated hologram, or by E-beam engraving. The second step comprises using the master to replicate the hologram on a piece of plastics material film on a plastics material or glass substrate. The resultant plate is then coated to reduce reflections and/or to improve scratch resistance.

An alternative holographic scan window, having two spatial frequency distributions, is shown in FIG. 3B. This window has a narrow central portion 113a on either side of the scan line 100, and first and second outside portions 113b. The central portion 113a has a first spatial frequency distribution given by equation (2) above. The portion 113b has a different spatial frequency distribution, given by the same equation but with a different value of f and also possibly a different value of θ. The values of f and θ for the central portion 113a are designed for the requirements of the outgoing beam, while those of the portions 113b are designed for the requirements of the incoming (reflected) beam.

Yet a further alternative holographic scan window is shown in FIG. 3C. The proportions 113b are identical to those of FIG. 3B, but the central portion 113a has been split up into three separate portions 113c, 113d, and 113e, each having different spatial frequency distributions. As before, each spatial frequency distribution may be given by equation (2), with appropriate values of f and θ. The portions 113c, 113d, and 113e represent holographic windows for laser beam scanning, whereas the portions 113b are for signal receiving.

Some examples will now be given to show how the holographic windows of FIGS. 3A and 3C may be used in hand-held portable laser bar code scanners. It will be appreciated, of course, that windows of the type shown in FIG. 3 could also be used in other scanners, such as fixed installations.

Figure 4A:
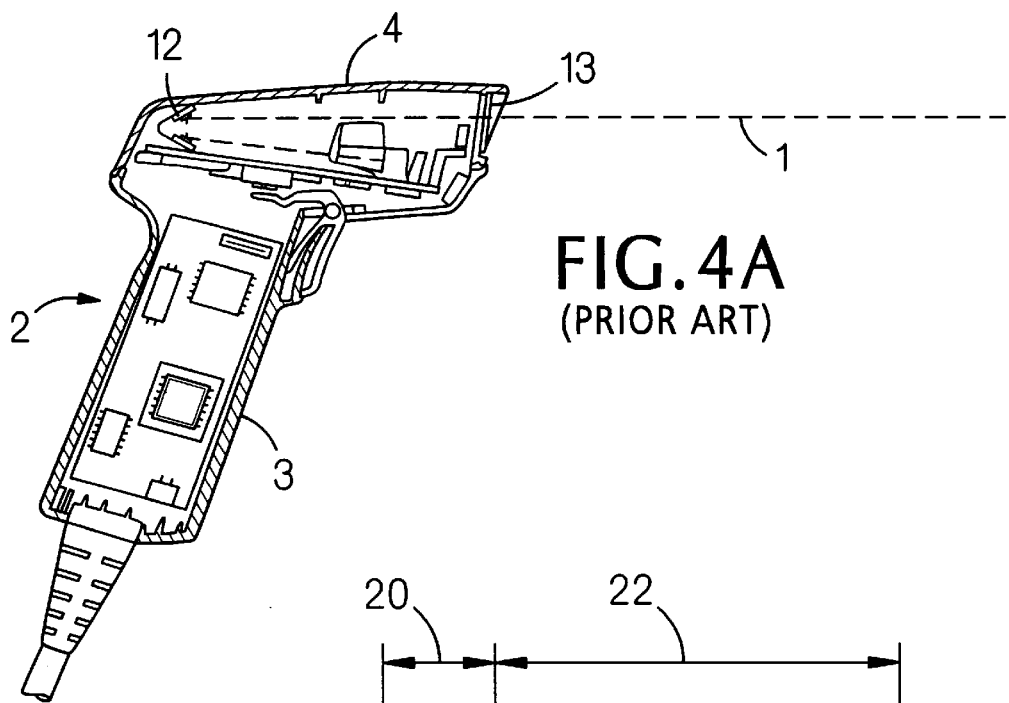
FIGS. 4A and 4B show, schematically, the operation of a conventional bar code scanner.
Figure 4B:
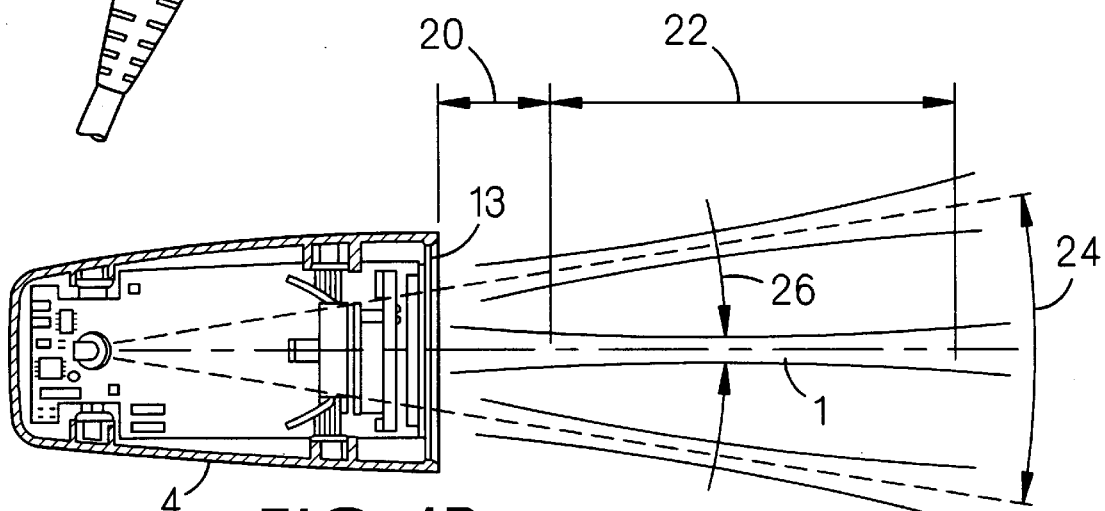

FIGS. 4A and 4B illustrate a conventional bar code scanner using a conventional transmissive scan window 13. As may be seen in FIG. 4B, the scanner produces a scanning beam having a beam waist 26. The beam scans across a scan angle 24 providing symbol-reading capabilities throughout a working range 22. In front of the working range there is a dead zone 20 within which a bar code symbol is normally too close to the scanner housing to be properly decoded.

Figure 4C:
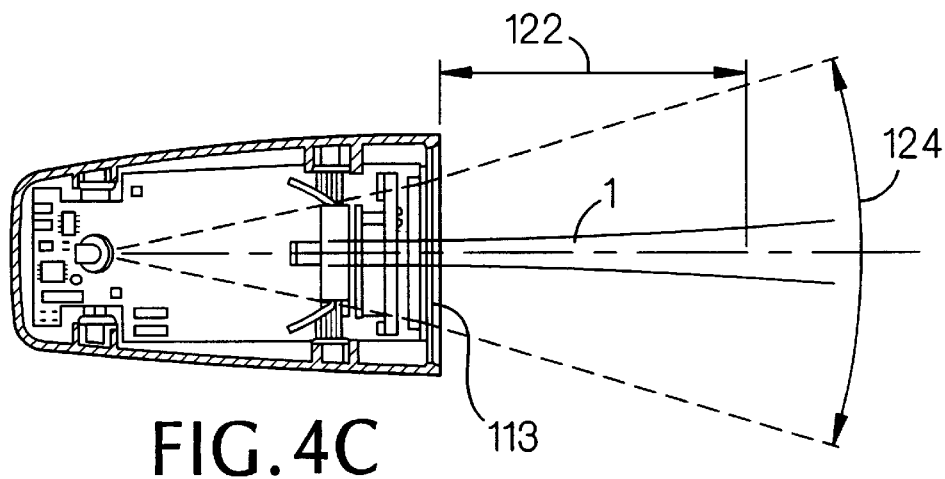
FIG. 4C is a drawing corresponding to that of FIG. 4B but of a scanner embodying the present invention including a holographic scan window.

As may be seen in FIG. 4C, the replacement of the conventional window 13 with a suitable holographic window 113 may eliminate the dead zone and may improve the working range to a new value 122. The scan angle 24 may also be improved and widened to a new scan angle 124. This may be achieved by making use of a hologram which has a spatial frequency distribution given by equation (2) in which the focal length f is negative. This produces a holographic window which is, in many ways, equivalent to a negative lens. A wide angle scanner of this type is efficient for high density bar code reading.

FIGS. 5A and 5B show a second application of a holographic window. FIG. 5A shows a taut band element scanning mechanism 50. Light from a laser (not shown) impinges upon a small mirror $M_1'$ which is glued onto an underlying scanning mirror $M_1$. The light is then reflected from a second mirror $M_2$, and out of the housing via a holographic scan window 113, shown in FIG. 5B. Scanning is achieved by mounting both of the mirrors $M_1$, $M_2$ onto thin pieces of elastic film 56, so that they may oscillate. Oscillation is forced by virtue of a permanent magnet 54 secured to the mirror and driven by an electric driving coil 52.

Light which has been reflected from a target symbol or indicia passes back through the holographic scan window 113 to the mirror $M_2$, from where it is reflected to the mirror $M_1$. The light is then reflected onto a photodetector (not shown). The holographic window 113 is of the form shown in FIG. 3A, having a focal length f which is positive. This produces a reduced scan angle 224 and a correspondingly reduced field of view. The result is improved flat field scanning.

Figure 6A:
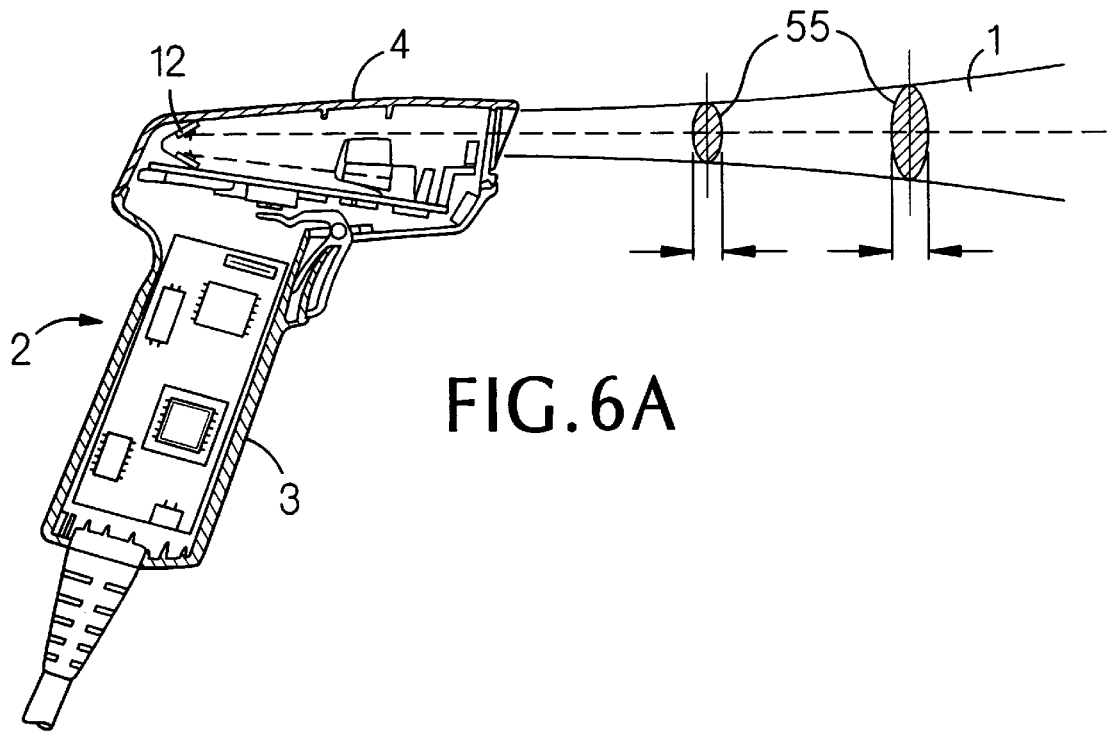
FIGS. 6A and 6B illustrate the operation of an embodiment using a holograph scan window with two different spatial frequency distributions; the holographic optical element 113a (see FIG. 3B) changes the cross-section of laser spot to a long elliptical spot in order to read badly-printed/dot matrix symbols.
Figure 6B:
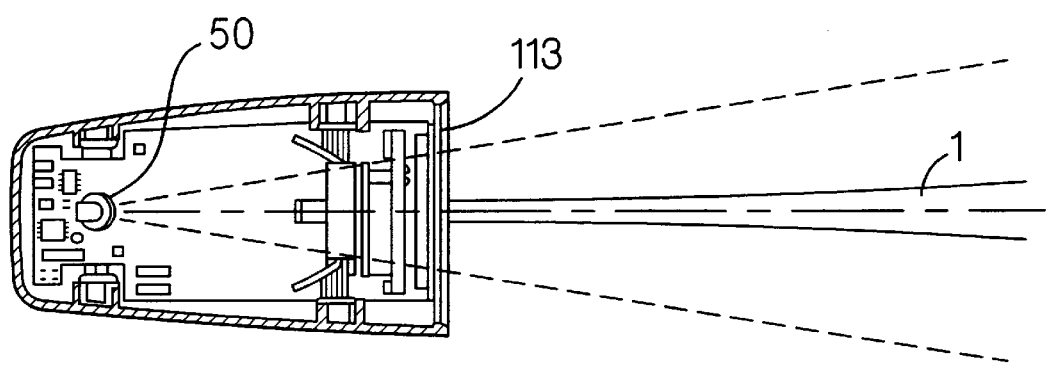

FIGS. 6A and 6B show yet a further embodiment in which the holographic scan window takes the form shown in FIG. 3B. The central portion 113a through which the outgoing scanning beam 1 passes has a different spatial frequency distribution from the portions 113b which receive the majority of the incoming reflected light. The former behaves like a negative cylindrical lens to change the cross-section of the laser beam to produce a long elliptical laser spot 55. The shape of the spot may be chosen according to the indicia to be read, but in general a long elliptical laser spot such as is shown in FIG. 6A is more efficient for reading badly printed dot-matrix and postage symbols.

The spatial frequency of the portion 113a, in order to achieve this effect, may best be characterized by rewriting equation (2) in Cartesian coordinates, as follows:

$$v(x, y) = \frac{1}{\lambda}\left[\sin\left(\tan^{-1}\frac{\sqrt{X_2 + Y_2}}{f_1}\right) - \sin\theta_1\right] \quad (3)$$

where x and y represent mutually perpendicular directions from the origin O as shown in FIG. 3A.

The frequency distribution at any point (x,y) on the window may now be determined according to equation (3) where $f_1$ is the frequency and θ is the oblique angle of the reference wave.

The spatial frequency of the portion 113a in FIG. 3B is given by equation (3) when x=0. This produces the effect of a negative cylindrical lens in the center of the window.

The outside portions 113b have a frequency distribution which is appropriate for receiving the reflected light and for focusing it back onto the collector mirror.

Figure 7:
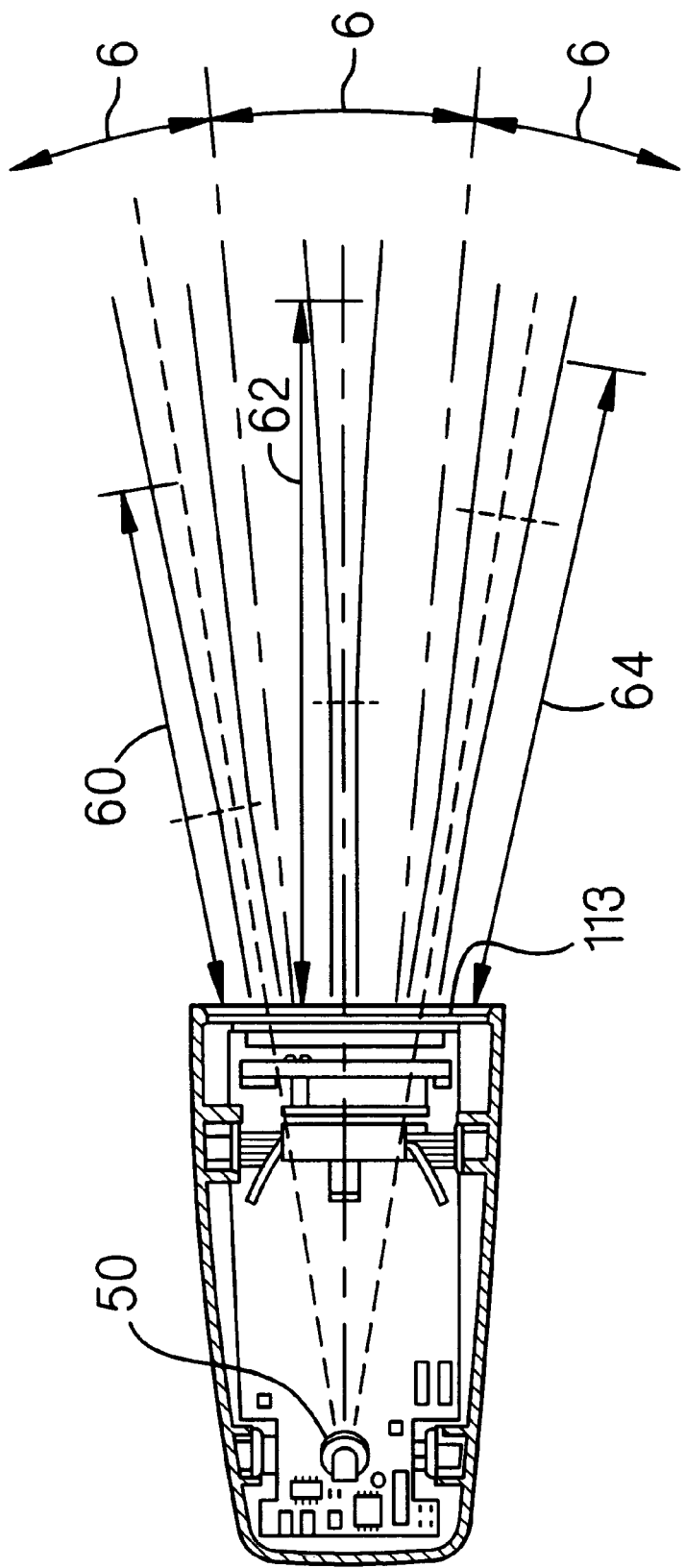
FIG. 7 illustrates the operation of a bar code scanner embodying the present invention, using the holographic scan window of FIG. 3C.

Yet a further embodiment is shown in FIG. 7. This makes use of a holographic scan window having three individual central portions 113c, 113d, and 113e as shown in FIG. 3C. Since each portion has a different focal length, and the laser beam passes through each in turn, three separate scanning regimes are automatically provided: a short working range 60 having a scan angle 61, a medium working range 62 having a scan angle 63, and a long working range 64 having a scan angle 63, and a long working range 64 having a scan angle 65. Though not drawn to scale in the figure, the location of the beam waist (shown by a dashed line) is closest to the scanner for the short working range 60, further from the scanner for the medium working range 62, and furthest from the scanner for the long working range 64. Such an arrangement provides greater scanning efficiency where the density of the symbol to be read, and the distance from the scanner, may vary.

Figure 8A:
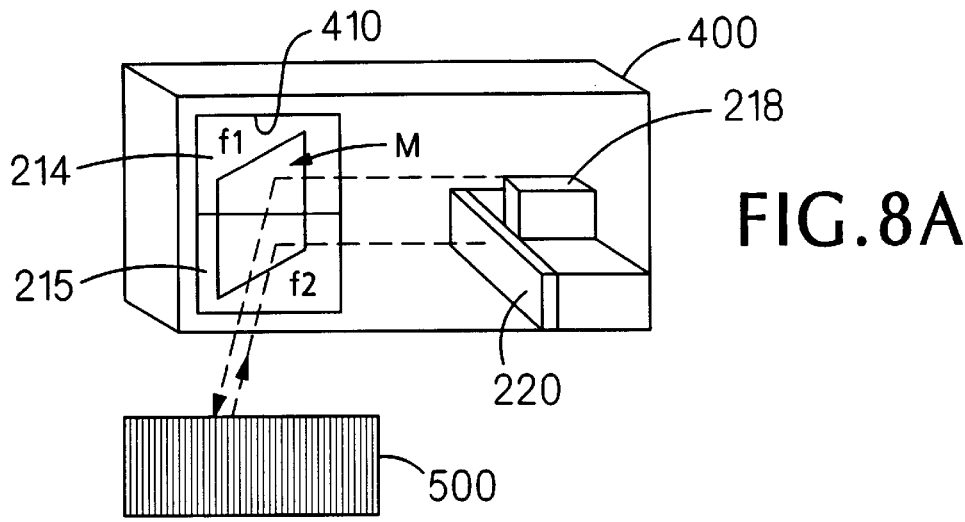
FIGS. 8A, 8B, and 8C show, diagrammatically, three further embodiments of the present invention in which the scanner window comprises a diffractive optical element.
Figure 8B:
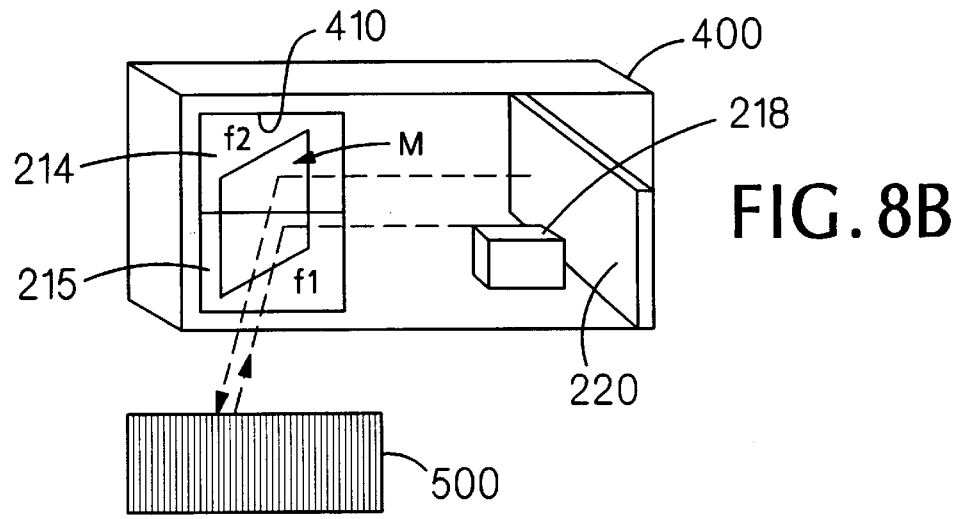
Figure 8C:
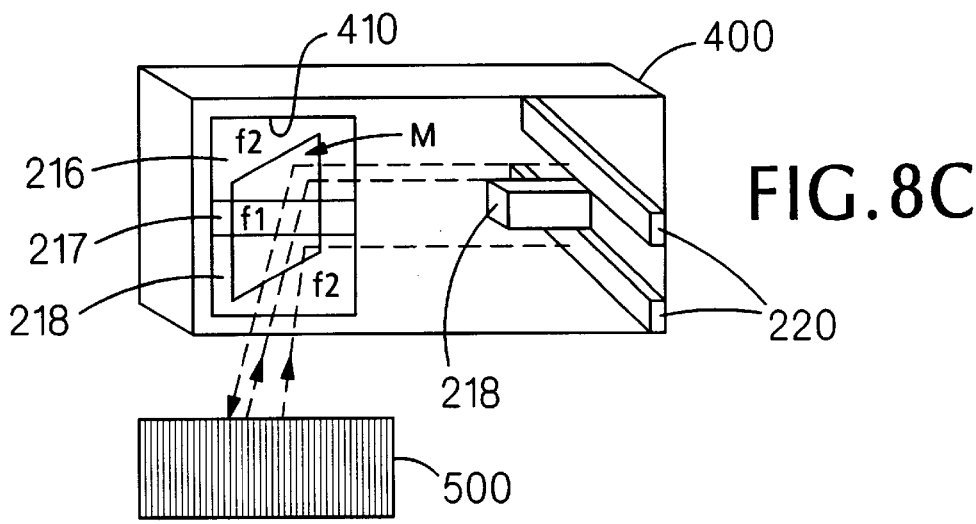

Three further embodiments are shown, diagrammatically, in FIGS. 8A to 8C. In FIG. 8A, a scanner housing 400 contains a laser and focusing module 218, the beam from which is directed to a scanning mirror M. The mirror directs the scanning beam out of a window 410 in the housing so that it impinges upon an indicia 500 to be read. Within the window 410 is a two-part holographic optical element or diffractive optical element having a first portion 214 and a second portion 215. The focal length $f_1$ of the first portion is chosen so that light leaving the scanner is properly focused onto the indicia 500. The focal length $f_2$ of the second portion is chosen to receive reflected light from the indicia and to focus it onto an elongate photodetector 220, via the mirror M.

FIG. 8B shows an alternative embodiment in which the detector 220 permits two-dimensional imaging. The detector may, for example, be a two-dimensional charge-coupled device array.

In yet a further embodiment shown in FIG. 8C, there are two separate elongate detectors 220. The light beam from the laser 218 passes through a central section 217 of the diffractive optical element or holographic optical element, which focuses it onto the indicia 500. Light reflected back from the indicia passes through outer areas 216, 218 of different focal lengths $f_2$; these focus the light via the mirror M onto the respective photodetectors 220.

It will of course be appreciated that holographic elements embodying the present invention need not have separate zones or segments which are configured in precisely the same ways that have been described. Many different zone or segmented windows could be envisaged, according to the particular application required, which may include either one-dimensional or two-dimensional scanning. Within any particular zone or segment of the element, there may be either a constant spatial frequency distribution, or a frequency distribution which varies with position. The frequency distribution may be radially symmetric, or alternatively it may be symmetric along an axis of reflection, thereby creating an effect similar to a cylindrical lens or mirror. It would also be possible, of course, for the frequency distribution to vary across the surface in other (e.g., more complex) ways.

As an alternative to the use of a holographic element as a window of the scanner, it would instead be possible to use one or more optical elements within the scanner which incorporate a holographic element (e.g., a mirror with a diffraction grating). For example, the collection mirror $M_2$ of FIG. 5A of the mirror M of FIGS. 8A to 8C could include or consist of a diffraction grating.

Still other embodiments are within the scope of the following claims.

What is claimed is:

1. An optical scanner for scanning a light beam across a target to read optical indicia, the scanner comprising:
    a light source for producing the light beam;
    one or more beam-generation optical elements for shaping and directing the light beam;
    one or more collector optical elements for collecting and shaping light reflected from the target;
    a photosensor for detecting at least a portion of the light collected by the collector elements, and for generating an electrical signal indicative of the intensity of the light collected,
    wherein at least one of the beam-generation optical elements comprises an optical diffuser configured to shape the light beam,
    wherein the optical diffuser comprises a light shaping diffuser comprising a holographic element that accepts incoming light, and homogenizes and redistributes it over a predetermined angular spread;
    wherein the optical diffuser comprises a plurality of sections, each section configured to shape the light beam differently from another section;
    wherein at least two of the sections of the optical diffuser have optical characteristics that differ in ways that shape the light beam differently so that the light beam passing through the two sections is given a different beam waist; and
    wherein the scanner is configured for reading indicia in which information is encoded as differences in reflectivity of portions of the indicia.

2. The optical scanner of claim 1 wherein at least one of the collector optical elements comprises an optical diffuser configured to shape the light collected.

3. The optical scanner of claim 2 wherein the optical diffuser forming a beam-generation optical element and the optical diffuser forming a collector optical element are sections of the same optical diffuser.

4. The optical scanner of claim 3 wherein the collector optical elements are configured for retroreflective light collection.

5. The optical scanner of claim 3 wherein the section of the optical diffuser forming the beam-generation optical element is positioned between two sections of the optical diffuser forming the collection optical element.

6. The optical scanner of claim 5 wherein the section of the optical diffuser forming the beam-generation optical element is a narrow, elongated section positioned generally centrally of two sections of the optical diffuser forming the collector optical element.

7. The optical scanner of claim 5 wherein differences in optical characteristics between sections of the optical diffuser are produced by differences in spatial frequency.

8. The optical scanner of claim 2 wherein the optical diffuser forming a collection optical element has optical properties that are rotationally symmetric.

9. The optical scanner of claim 1 wherein the scanner is configured as a hand held bar code reader.

10. The optical scanner of claim 1 wherein at least two of the sections of the optical diffuser have optical characteristics that produce differences in focal length.

11. The optical scanner of claim 1 wherein there is a first and a second section of the optical diffuser forming a beam-generation optical element, and the light beam crosses the first section before crossing the second section.

12. The optical scanner of claim 11 wherein there is a third section of the optical diffuser forming a beam-generation optical element, and the light beam crosses the third section after it has completed crossing the second section.

13. The optical scanner of claim 1 wherein the optical diffuser forming a beam-generation optical element has optical properties that are symmetrical about a path traced out by the light beam.

14. The optical scanner of claim 1 wherein each optical diffuser is at least a portion of the window through which the light beam leaves the scanner.

15. The optical scanner of claim 1 wherein each optical diffuser forming a beam-generation optical element has optical properties that are symmetrical about a path traced out by the light beam.

16. The optical scanner of claim 1 or 2 wherein the beam generation optical elements include a scanning mirror for scanning the light beam across the optical diffuser forming a beam-generation optical element, and the optical diffuser forming a collection optical element being configured to direct the collected light to the photosensor via the scanning mirror.

17. The optical scanner of claim 1 or 2 wherein the optical diffuser is a diffractive optical element.

18. The optical scanner of claim 1 or 2 wherein the optical diffuser is a reflective diffraction grating.

19. A method for scanning a light beam across a target, the method comprising the steps of:
    using a light source to produce the light beam;
    shaping and directing the light beam with one or more beam-generation optical elements;
    collecting and shaping light reflected from the target with one or more collector optical elements;
    using a photosensor to detect at least a portion of the light collected by the collector elements, and to generate an electrical signal indicative of the intensity of the light collected,
    wherein at least one of the beam-generation elements comprises an optical diffuser configured to shape the light beam,
    wherein the optical diffuser comprises a light shaping diffuser comprising a holographic element that accepts incoming light, and homogenizes and redistributes it over a predetermined angular spread;
    wherein optical diffuser comprises a plurality of sections, each section configured to shape the light beam differently from another section;
    wherein at least two of the sections of the optical diffuser have optical characteristics that differ in ways that shape the light beam differently so that the light beam passing through the two sections is given a different beam waist; and wherein the scanner is configured for reading indicia in which information is encoded as differences in reflectivity of portions of the indicia.

20. The method of claim 19 wherein at least one of the collector optical elements comprises an optical diffuser configured to perform at least a portion of the step of shaping the light collected.

* * * * *